Patented Sept. 18, 1945

2,385,111

UNITED STATES PATENT OFFICE 2,385,111

PROCESS FOR THE PRODUCTION OF NITROETHYLENE

Arthur Ernest Wilder Smith, Robert Holroyd Stanley, and Charles William Scaife, Norton-on-Tees, England, assignors to Imperial Chemical Industries Limited, a corporation of Great Britain No Drawing. Application June 29, 1943, Serial No. 492,781. In Great Britain February 2, 1942

6 Claims. (Cl. 260—644)

This invention relates to the production of nitroethylene in monomeric and polymeric forms.

We have found that nitroethylene can be prepared by reacting 1:2-dinitroethane and/or β-nitroethyl nitrate with an alcohol, the reaction apparently proceeding according to the equations:

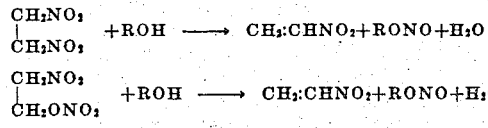

It is preferred to employ a lower aliphatic alcohol, e. g., methyl alcohol, ethyl alcohol, propyl alcohols, amyl alcohols, but other alcohols which are liquid under the reaction conditions may be employed, e. g., unsaturated aliphatic alcohols, such as allyl alcohol, polyhydric alcohols, such as glycol, aromatic and hydroaromatic alcohols, such as benzyl alcohol and cyclohexanol, and other compounds possessing an alcoholic group such as esters of glycollic acid.

The temperature does not appear to be critical. At room temperature and below the reaction is slow, but it increases rapidly as the temperature is increased. The upper limit of temperature appears to be governed by the tendency of 1:2-dinitroethane and β-nitroethyl nitrate to decompose at raised temperatures.

The nitroethylene should be removed from the reaction zone as soon as it is formed by rapidly distilling it off in the vapour of the alcohol, and the vapours rapidly cooled in order to impede the tendency of the nitroethylene to react with the alcohol.

It is already known that even a trace of alkali promotes the polymerisation of nitroethylene. It will therefore be evident that when monomeric nitroethylene is required it is inadvisable to carry out the reaction in vessels made of a material which releases alkali. For example, we have found that ordinary soft soda glass, even when previously washed with acid, can eventually cause the deposition of polymeric nitroethylene. On the other hand, glass such as those sold under the registered trade-marks "Pyrex" and "Hysil" have been found to be suitable.

This invention further includes the production of polymeric nitroethylene by subjecting the condensate containing the monomeric nitroethylene to the action of a small amount of alkali, e. g., ammonia, caustic potash, caustic soda, sodium ethoxide, ammonium carbonate, sodium carbonate, potassium carbonate, sodium bicarbonate, potassium bicarbonate, barium hydroxide, calcium hydroxide. It is preferred to employ a volatile alkali such as ammonia or a lower alkylamine, in the receiver for the condensate, whereby the condensate immediately comes into intimate contact with the alkali on entering the receiver.

It is desirable to use only a trace of alkali otherwise there is a tendency for the polymerisation not to proceed clearly.

Example 1

30 grams of liquid dinitroethane (melting point 38° C.–40° C.) were placed in a dropping funnel fitted to a three-necked 500 ccs. flask made of glass sold under the registered trade-mark "Pyrex"; in the two remaining necks were placed an inlet tube reaching to the bottom of the flask, and a thermometer. A side arm led off from the neck containing the thermometer just above its bulb and was connected to an efficient condenser in the distilling position.

The inlet tube was connected to a boiler containing ethanol. By heating the boiler, a stream of the alcohol vapour was sent through the three-necked flask which was heated to about 20° above the boiling point of the alcohol used. The dinitroethane was then allowed to drop in slowly, and after an induction period of about 10 minutes, the lachrymatory odour of nitroethylene monomer was detected in the distillate. It was found that the induction period could be shortened by placing in the three-necked flask a small amount of the non-volatile residues from a previous preparation. After the passage of 200–300 ccs. of alcohol through the apparatus, the reaction was almost complete. The yield of monomeric nitroethylene in the distillate was about 80%.

Example 2

30 grams of 1:2-dinitroethane were melted and placed in a dropping funnel connected in one neck of a three-necked flask, fitted up as described in Example 1. Ethanol vapour was passed through the inlet tube from an ethanol boiler, and the three-necked flask was heated to 100° C., on a water bath. The start of the reaction as shown by a lachrymatory odour in the distillate took place after 5–10 minutes. A trace of 10% alcoholic potassium hydroxide was added from time to time to the distillate to quicken polymerisation and avoid reaction of monomeric nitroethylene with the excess alcohol present. Stirring was necessary to avoid a neutral top layer in the distillate. The thermometer registered 77° for the greater part of the distillation, which was continued until the odour of nitroethylene in the distillate was much reduced. At the end of the distillation, more alkali was added to the distillate, since there was still an appreciable odour of nitroethylene. The distillate was allowed to stand for ½ hour and then strong hydrochloric acid was added until the pale yellow colour gave way to a white colour. The solid polymeric nitroethylene was then separated by filtration.

*Example 3*

30 grams of β-nitroethyl nitrate were placed in a dropping funnel connected in one neck of a three-necked flask made of glass sold under the registered trade-mark "Pyrex." In the two remaining necks were placed an inlet tube reaching to the bottom of the flask and a thermometer. A side arm led off from the neck containing the thermometer just above its bulb and was connected to an efficient condenser in the distilling position. The inlet tube was connected to a boiler containing ethanol. A stream of ethanol vapour was passed through the inlet tube into the flask which was heated to 100° C., on a water bath. The β-nitroethyl nitrate was then allowed to drop in slowly and after a short induction period the lachrymatory odour of nitroethylene monomer was detected in the distillate.

*Example 4*

The process of Example 3 was repeated except that the distillate was stirred by an electric motor and a trace of strong ammonia solution was added from time to time to promote polymerisation of the monomeric nitroethylene. At the end of the distillation, an additional trace of alkali was added to the distillate which was then left for half an hour. Strong hydrochloric acid was then added to the distillate until the pale yellow colour gave way to a white colour, and the solid polymer was finally filtered off from the liquid.

We claim:

1. A process for the preparation of nitroethylene which comprises reacting with an alcohol, a substance from the group 1:2-dinitroethane, β-nitroethyl nitrate, rapidly distilling off the nitroethylene in the vapour of the alcohol, and rapidly cooling the vapours in order to impede reaction of the nitroethylene with the alcohol.

2. A process for the production of nitroethylene which comprises reacting with a lower aliphatic alcohol, a substance from the group 1:2-dinitroethane, β-nitroethyl nitrate, rapidly distilling off the nitroethylene in the vapour of the alcohol, and rapidly cooling the vapours in order to impede reaction of the nitroethylene with the alcohol.

3. A process for the preparation of polymeric nitroethylene which comprises reacting a substance from the group 1:2-dinitroethane, β-nitroethyl nitrate with an alcohol, rapidly distilling off the nitroethylene in the vapour of the alcohol, rapidly cooling the vapours and contacting the condensate with a small amount of alkali.

4. A process for the preparation of polymeric nitroethylene which comprises reacting a substance from the group 1:2-dinitroethane, β-nitroethyl nitrate with a lower aliphatic alcohol, rapidly distilling off the nitroethylene in the vapour of the alcohol, rapidly cooling the vapours and contacting the condensate with a small amount of alkali.

5. A process for the preparation of polymeric nitroethylene which comprises reacting a substance from the group 1:2-dinitroethane, β-nitroethyl nitrate with an alcohol, rapidly distilling off the nitroethylene in the vapour of the alcohol, rapidly cooling the vapours and contacting the condensate with a small amount of a volatile alkali.

6. A process for the preparation of polymeric nitroethylene which comprises reacting a substance from the group 1:2-dinitroethane, β-nitroethyl nitrate with a lower aliphatic alcohol, rapidly distilling off the nitroethylene in the vapour of the alcohol, rapidly cooling the vapours and contacting the condensate with a small amount of a volatile alkali.

ARTHUR ERNEST WILDER SMITH.
ROBERT HOLROYD STANLEY.
CHARLES WILLIAM SCAIFE.